(12) United States Patent
Chalmers et al.

(10) Patent No.: US 11,092,262 B2
(45) Date of Patent: Aug. 17, 2021

(54) MECHANICALLY LINED PIPE HAVING AN INNER POLYMER LINER

(71) Applicant: TECHNIP FRANCE, Courbevoie (FR)

(72) Inventors: Martin Chalmers, Aberdeenshire (GB); Jitender Rai, Aberdeenshire (GB); Tomasz Tkaczyk, Aberdeenshire (GB)

(73) Assignee: TECHNIP FRANCE

( * ) Notice: Subject to any disclaimer, the term of this patent is extended or adjusted under 35 U.S.C. 154(b) by 348 days.

(21) Appl. No.: 16/324,929

(22) PCT Filed: Aug. 25, 2017

(86) PCT No.: PCT/IB2017/001160
§ 371 (c)(1),
(2) Date: Feb. 12, 2019

(87) PCT Pub. No.: WO2018/042246
PCT Pub. Date: Mar. 8, 2018

(65) Prior Publication Data
US 2021/0156496 A1    May 27, 2021

(30) Foreign Application Priority Data
Sep. 1, 2016 (GB) ..................................... 1614796

(51) Int. Cl.
*F16L 9/147* (2006.01)
*F16L 1/12* (2006.01)
(Continued)

(52) U.S. Cl.
CPC .............. *F16L 9/147* (2013.01); *B29C 63/42* (2013.01); *F16L 1/123* (2013.01); *F16L 58/08* (2013.01);
(Continued)

(58) Field of Classification Search
CPC . F16L 9/147; F16L 58/08; F16L 58/10; F16L 58/1036; F16L 1/129; F16L 9/20;
(Continued)

(56) References Cited

U.S. PATENT DOCUMENTS 4,556,240 A * 12/1985 Yoshida ................... F16L 58/08
                                                        138/109
5,152,323 A * 10/1992 Shotts ...................... B21C 37/09
                                                        138/143
(Continued)

FOREIGN PATENT DOCUMENTS

CN        101839375 A      9/2010
CN        203036108 U      7/2013
(Continued)

OTHER PUBLICATIONS

International Search Report dated Dec. 6, 2017 in corresponding PCT International Application No. PCT/IB2017/001160.
(Continued)

*Primary Examiner* — Patrick F Brinson
(74) *Attorney, Agent, or Firm* — Ostrolenk Faber LLP

(57) ABSTRACT

A mechanically lined pipe including a host pipe having an inner surface which is lined with a metallic liner, the metallic liner having an inner surface which is lined with a polymer liner which presses the metallic liner against the inner surface of the host pipe, as well as to methods of reeling and unreeling the mechanically lined pipe. A method of making a mechanically lined pipe having an internal polymer liner, the mechanically lined pipe including a host pipe having an inner surface which is lined with a metallic liner, the method including the steps of: (a) providing a mechanically lined pipe having an internal diameter, (b) providing a polymer liner having an outer diameter which is greater than the internal diameter of the mechanically liner pipe, (c) reducing the outer diameter of the polymer liner such that it is less
(Continued)

than the internal diameter of the mechanically liner pipe, (d) inserting the polymer liner into the mechanically lined pipe, and (e) allowing the polymer liner to expand such that it presses the metallic liner against the inner surface of the host pipe.

15 Claims, 7 Drawing Sheets

(51) Int. Cl.
    *F16L 58/08*     (2006.01)
    *B29C 63/42*     (2006.01)
    *F16L 58/10*     (2006.01)
    *B29K 701/12*     (2006.01)
    *B29L 23/00*     (2006.01)
    *B29K 705/00*     (2006.01)

(52) U.S. Cl.
    CPC ...... *F16L 58/1036* (2013.01); *B29K 2701/12* (2013.01); *B29K 2705/00* (2013.01); *B29L 2023/22* (2013.01)

(58) Field of Classification Search
    CPC ............ B29K 2701/12; B29K 2705/00; B29C 63/42; Y10T 29/4994
    USPC .... 138/137, 138, 143, 98; 405/168.3, 184.2, 405/154.1, 166
    See application file for complete search history.

(56) References Cited

U.S. PATENT DOCUMENTS

| | | | | |
|---|---|---|---|---|
| 5,685,344 | A * | 11/1997 | Iorio | B29C 63/486 138/140 |
| 6,604,552 | B2 * | 8/2003 | Hansen | F16L 9/147 138/143 |
| 2010/0122747 | A1 * | 5/2010 | Blencoe | F17C 1/16 138/140 |
| 2013/0195557 | A1 * | 8/2013 | Bertaso | F16L 1/203 405/168.3 |
| 2013/0319570 | A1 * | 12/2013 | Winterstein | F16L 9/147 138/143 |
| 2014/0083550 | A1 * | 3/2014 | Messina | B29C 63/18 138/114 |
| 2015/0211342 | A1 | 7/2015 | Shaw et al. | |
| 2015/0337995 | A1 * | 11/2015 | Pepin | F16L 9/22 138/155 |

FOREIGN PATENT DOCUMENTS

| | | |
|---|---|---|
| GB | 807413 | 1/1959 |
| GB | 2527618 A | 12/2015 |
| WO | WO 2008/072970 A1 | 6/2008 |
| WO | WO 2010/010390 A2 | 1/2010 |
| WO | WO 2011/048430 A1 | 4/2011 |
| WO | WO 2011/051218 A1 | 5/2011 |
| WO | WO 2011/051221 A1 | 5/2011 |
| WO | WO 2015/198142 A1 | 12/2015 |

OTHER PUBLICATIONS

Written Opinion dated Dec. 6, 2017 in corresponding PCT International Application No. PCT/IB2017/001160.
Combined Search and Examination Report dated Feb. 15, 2017 in corresponding United Kingdom Patent Application No. 1614796.9.
T. Tkaczyk et al., "Reel-Lay Installation Approaches for Mechanically Lined Pipes," Paper OTC-26440-MS presented at the OTC conference, Kuala Lumpur, Mar. 22-25, 2016, 10 pages.
T. Sriskandarajah et al., "Fatigue Aspects of CRA Lined Pipe for HP/HT Flowlines," Paper OTC 23932 presented at the OTC conference, Houston, May 6-9, 2013, 14 pages.

* cited by examiner

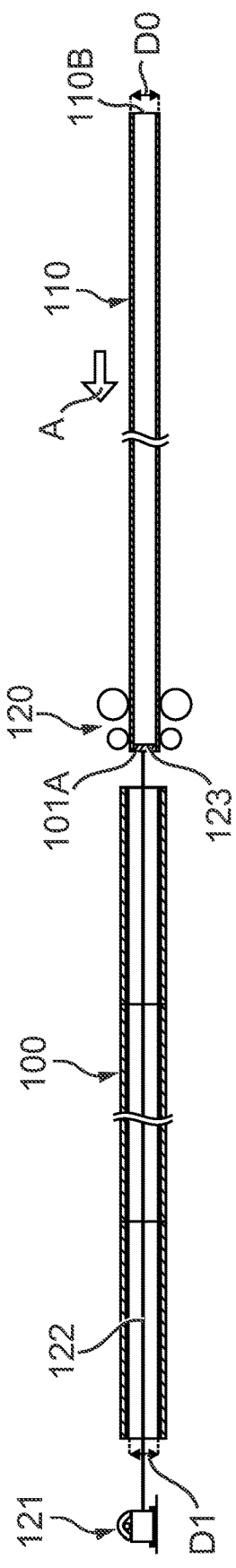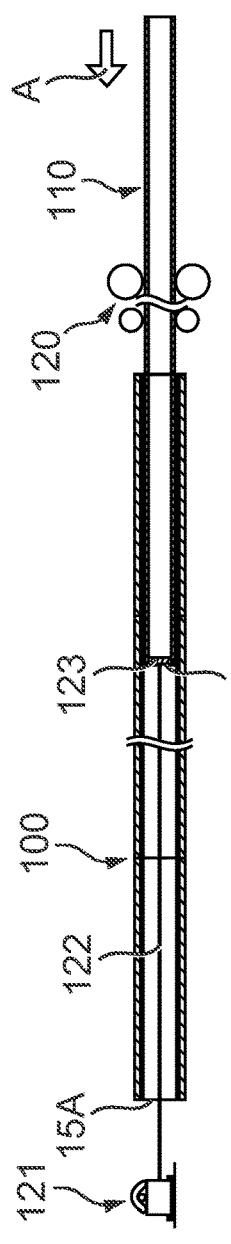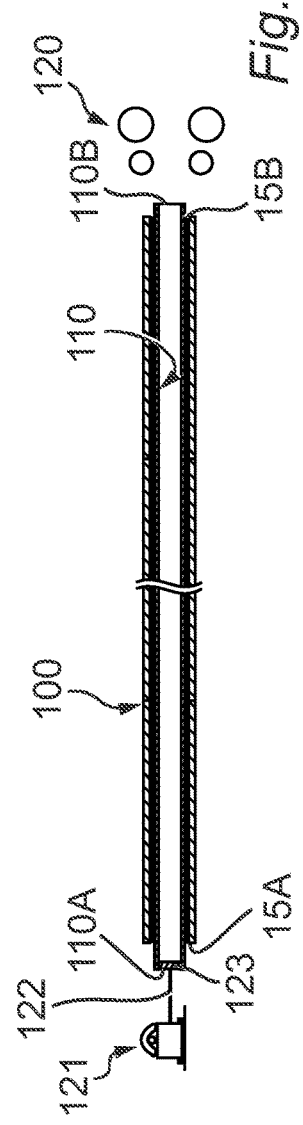

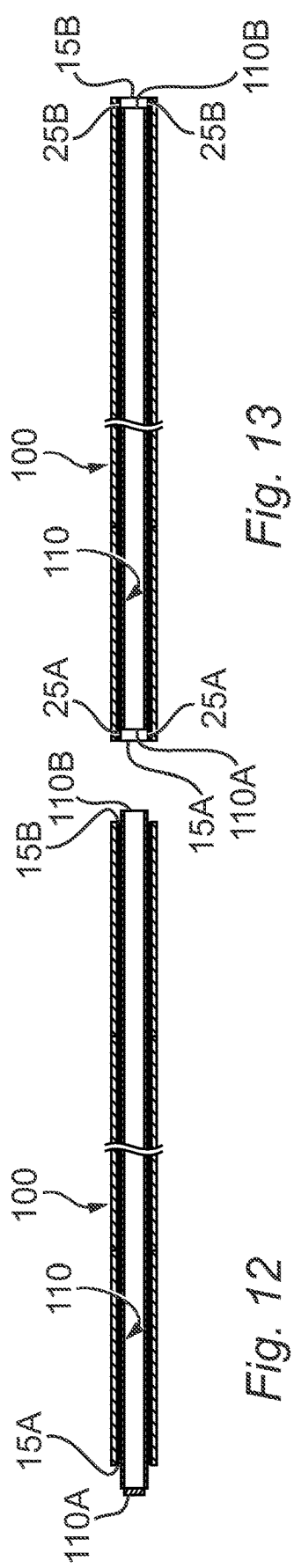
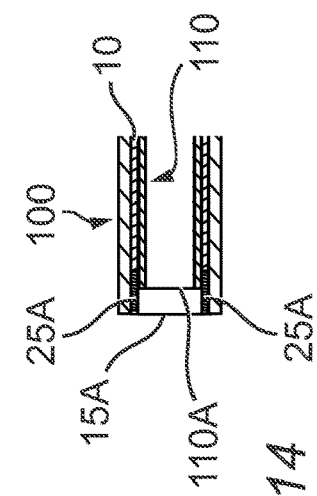
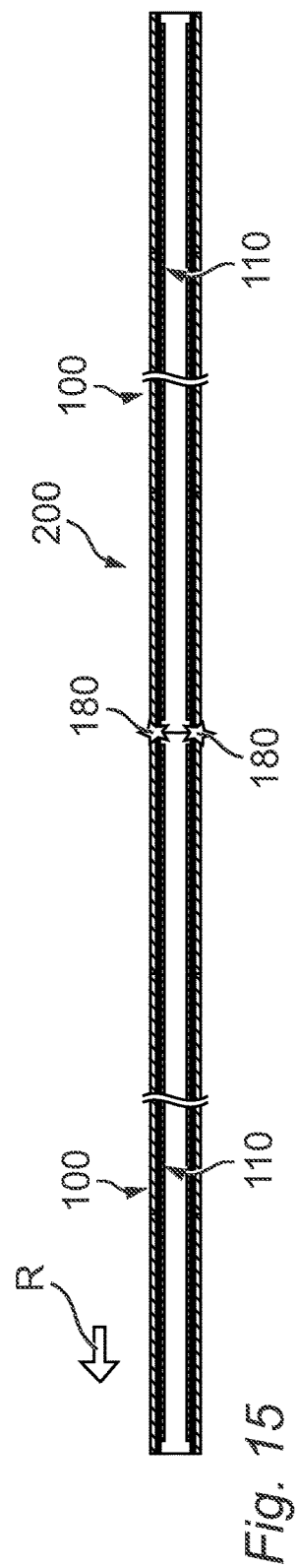

MECHANICALLY LINED PIPE HAVING AN INNER POLYMER LINER

CROSS-REFERENCE TO RELATED APPLICATIONS

The present application is a 35 U.S.C. §§ 371 national phase conversion of PCT/IB2017/001160, filed Aug. 25, 2017, which claims priority to United Kingdom Patent Application No. 1614796.9, filed Sep. 1, 2016, the contents of which are incorporated herein by reference. The PCT International Application was published in the English language.

This invention relates to a mechanically lined pipe having an inner surface which is lined with a polymer liner. It also relates to a method of making the pipe (or pipeline), as well as to methods of reeling and of laying the pipe.

BACKGROUND

Fluid produced from oil and gas wells is generally transported along pipelines, including subsea pipelines. This fluid is normally corrosive to the carbon steel which is often used to make such pipelines. Thus, the internal surface of these pipelines can be lined with a corrosion resistant material, normally a corrosion resistant alloy (CRA). The CRA can, for example, be an austenitic stainless steel, a duplex or a nickel-based alloy. Pipes lined in this way are known as bi-metallic pipes.

The bi-metallic pipe can, for example, be in the form of a hot roll bonded (HRB) clad pipe or a mechanically lined pipe (MLP). The manufacture of an HRB clad pipe involves metallurgically bonding a CRA plate to a carbon steel plate by hot rolling. Subsequently, the bonded plates are formed into the pipe shape and seam welded. In contrast to a HRB clad pipe, producing a MLP generally uses less energy and is less time-consuming because it involves forming a mechanical bond (interference fit) between the outer surface of the CRA liner and the inner surface of the carbon steel host pipe. Thus, for an MLP, along most of the pipe the interface between the CRA liner and the host pipe is maintained by mechanical bonding. The CRA liner only needs to be welded to the host pipe at both ends of each pipe joint, these joints normally being around 12 m in length. At these welding locations, the CRA liner is normally welded to the host pipe using a clad overlay weld. This weld protects this part of the host pipe against corrosion.

One method of laying subsea pipelines is known as reel laying. In this method, the pipeline is assembled onshore by welding pipe joints to obtain pipe stalks, which are normally around 750 m to 2 km in length, and then connecting several of these pipe stalks. The resulting pipeline is reeled onto a large reel, sometimes also termed a storage reel or drum. The reeled pipeline is then transported to the required location, normally by boat. In order to lay the pipeline, it is then unreeled from the reel.

A known disadvantage of MLPs is that the reeling and unreeling operations described above result in high longitudinal strains which may cause the CRA liner to detach from the host pipe. This may result in buckling and/or wrinkles forming in the CRA liner, which can damage the CRA liner. Various methods have been proposed for overcoming this problem. The two main approaches are (i) filling the MLP bore with water at a pressure of 5-30 bar during the reeling and unreeling operations, and (ii) increasing the thickness of the CRA liner. Both of these methods are discussed in Tkaczyk, T., Chalmers, M., Pépin, A., 2016—Reel-Lay Installation Approaches for Mechanically Lined Pipes—Paper OTC-26440-MS presented at the OTC conference, Kuala Lumpur, 22-25 Mar. 2016.

The first of these approaches is mentioned in WO 2008/072970 A1 (Statoil ASA), which attempts to solve the problem of buckling/wrinkling of the CRA liner in a MLP. This document describes a method involving reeling a section of pipeline onto a drum whilst an overpressure of 5-25 bar is maintained within the section using pressurised fluid. This overpressure is applied as further sections are reeled onto the drum, and is then also maintained within the pipeline when the pipeline is unreeled and placed on the seabed. Thus, the pipeline needs to be flooded with a fluid such that the required overpressure can then be provided.

A drawback of the method described in WO 2008/072970 A1 is that it requires non-standard installation procedures which are relatively complex. Thus, it can increase the project execution time and cost, as well as introducing risks such as damage to the MLP pipeline if there is an accidental pressure loss during reeling. A further disadvantage is that every time the MLP pipeline needs to be cut during laying (for example, to install an in-line-tee/structure or perform an Abandonment and Recovery (A&R) operation), it needs to be depressurised, partially dewatered and then re-flooded and re-pressurised before installation can be resumed. Some CRA liner materials also require the use of fresh water (rather than sea water) as the pressurised fluid. Access to fresh water can sometimes be limited in some parts on the world.

A similar method of pressurised reeling to minimise wrinkling of the CRA liner is described in WO 2011/051218 A1 (Subsea 7 Limited). The main focus of this document is onshore reeling. The method described is a two-stage pressurisation process involving filling a pipeline with fluid at an elevated pressure, and then increasing this pressure, before reeling or unreeling. There is no discussion of how to carry out pipeline intervention on a vessel, install an in-line-tee/structure, undertake A&R or perform a pigging operation during installation. This method suffers from the same drawbacks as described above in relation to WO 2008/072970 A1, i.e. complex installation procedures, requirement to depressurise and then repressurise if the pipeline needs to be cut offshore, and limited access to fresh water in some parts of the world. Further methods of pressurised reeling, which suffer from similar drawbacks, are discussed in WO 2011/051221 A1 (Subsea 7 Limited) and WO 2010/010390 A2 (Technip France). Pressurised reeling using potable water at a pressure of 30 bar is also discussed in Sriskandarajah, T., Roberts, G., 2013—Fatigue Aspects of CRA Lined Pipe for HP/HT Flowlines—Paper OTC 23932 presented at the OTC conference, Houston, 6-9 May 2013.

The second approach to avoiding buckling and/or wrinkles forming in the CRA liner, i.e. increasing the thickness of the CRA liner, is described in WO 2011/048430 A1 (Technip France). The required liner thickness mostly depends on the pipe diameter, the smallest bending radius of the reel and the liner plastic hoop expansion strain during manufacturing. This approach has an advantage over the pressurisation method described above in that it can be carried out at atmospheric pressure. However, because the required thickness of the CRA liner increases with increasing MLP diameter, this method can become economically unattractive for larger pipe diameters due to the cost of the CRA liner. It is well suited to pipe diameters of up to 12" (30 cm) nominal pipe size (NPS) for alloy 316L CRA liners, or up to 8" (20 cm) NPS for alloy 825 and 625 CRA liners.

A third approach, also usable at atmospheric pressure, involves securing the CRA liner to the host pipe by one or more longitudinal welds (see, for example, WO 2015/198142 A1 (Technip France)). In order to implement this method, it is necessary to insert a welding head a long way into the pipe and undertake welding, which increases the cost of this approach.

The present invention seeks to address the problem of minimising the risk of wrinkling of the CRA liner within a MLP by providing an improved MLP, as well as a method for making such an MLP. This invention also seeks to provide methods for reeling and laying the improved MLP.

STATEMENT OF INVENTION

According to one aspect of the invention, there is provided a mechanically lined pipe (MLP) comprising a host pipe having an inner surface which is lined with a metallic liner, the metallic liner having an inner surface which is lined with a polymer liner which presses the metallic liner against the inner surface of the host pipe.

According to a second aspect of the invention, there is provided method of making a mechanically lined pipe (MLP) having an internal polymer liner, the mechanically lined pipe comprising a host pipe having an inner surface which is lined with a metallic liner, the method comprising the steps of:
  (a) providing a mechanically lined pipe having an internal diameter,
  (b) providing a polymer liner having an outer diameter which is greater than the internal diameter of the mechanically liner pipe,
  (c) reducing the outer diameter of the polymer liner such that it is less than the internal diameter of the mechanically liner pipe,
  (d) inserting the polymer liner into the mechanically lined pipe, and
  (e) allowing the polymer liner to expand such that it presses the metallic liner against the inner surface of the host pipe.

According to a third aspect of the invention, there is provided a method of reeling a mechanically lined pipe as described above, comprising the step of reeling the mechanically lined pipe onto a reel.

According to a fourth aspect of the invention, there is provided a method of laying a mechanically lined pipe as described above, comprising the step of unreeling the mechanically lined pipe from a reel.

BRIEF DESCRIPTION OF THE DRAWINGS

This invention will be further described by reference to the following Figures which are not intended to limit the scope of the invention claimed, in which:

FIG. 9 shows a cross-sectional view of the initial step of the insertion of the polymer liner stalk into the MLP stalk, immediately prior to insertion into the MLP stalk, according to one embodiment of the invention, FIG. 10 shows a cross-sectional view of a further step of the insertion of the polymer liner stalk, during the insertion into the MLP stalk, according to one embodiment of the invention, FIG. 11 shows a cross-sectional view of a further step of the insertion of the polymer liner stalk immediately after its insertion into the MLP stalk according to one embodiment of the invention, FIG. 12 shows a cross-sectional view of a further step of the insertion of the polymer liner stalk into the MLP stalk once the insertion means have been removed, FIG. 13 shows a cross-sectional view of the final step of the insertion of the polymer liner stalk into the MLP stalk once both extremities of the polymer liner stalk have been cut to length, FIG. 14 shows a close-up cross-sectional view of one end of the polymer liner stalk once inserted into the MLP stalk as shown in FIG. 13, FIG. 15 shows a cross-sectional view of the connecting of two MLP stalks during the formation of an MLP pipeline according to one embodiment of the invention.

DETAILED DESCRIPTION

Figure 1:
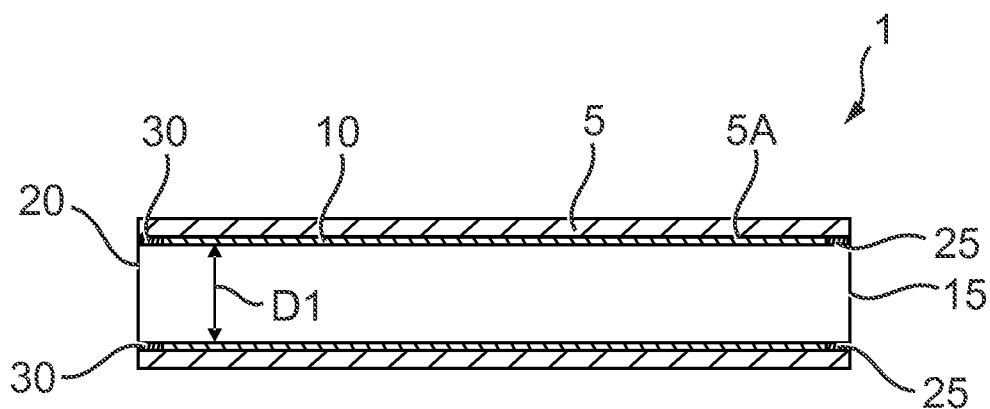
FIG. 1 shows a cross-sectional view of a MLP joint from which the MLP stalk will be made, according to one embodiment of the invention.

It has been surprisingly found by the inventors that the invention can provide a low cost MLP comprising a thin metallic (CRA) liner that can be installed at atmospheric pressure whilst minimising the risk of wrinkling of the liner. By allowing reeling and unreeling of the MLP at atmospheric pressure, the complexity and cost of the laying process are reduced.

In particular, the MLP of the invention may be a subsea pipeline, more particularly for transporting fluid from an oil or gas well.

The polymer liner may exert a contact pressure of at least 3 bar on the metallic liner, more particularly 3-50 bar. In particular, the polymer liner may exert a contact pressure of 5-40 bar on the metallic liner. According to a preferred embodiment, the polymer liner may exert a contact pressure of 7-30 bar on the metallic liner. In the MLP of the invention, the interior of the polymer liner is generally referred to as the bore of the MLP. The contact pressure exerted by the polymer liner on the metallic liner is oriented radially and consequently the terms "contact pressure" and "radial pressure" have the same meaning in the present application.

The host pipe may be formed from carbon steel. The metallic liner may be formed from a corrosion resistant alloy (CRA). In particular, the CRA may be stainless steel, preferably austenitic stainless steel or duplex stainless steel, or a nickel-based alloy. The metallic liner may have a thickness of equal to or less than 3 mm. The metallic liner may be metallurgically bonded, for example by welding, to the host pipe at its ends.

The polymer liner may be formed from at least one polymer selected from the group consisting of low-density polyethylene (LDPE), medium-density polyethylene (MDPE), high-density polyethylene (HDPE), polyethylene of raised temperature resistance (PE-RT), polypropylene (PP), polyamide (PA) and polyvinylidene fluoride (PVDF).

The host pipe, metallic liner and/or polymer liner may generally be in the form of a tube or hollow cylinder. Each tube or hollow cylinder may generally comprise a wall comprising an outer surface having an outer diameter, a wall thickness, and an inner surface having an inner diameter, as well as two opposing open ends. For the polymer liner, the ratio of the outer diameter to the wall thickness may be between 10:1 and 100:1, more particularly between 25:1 and 50:1. The metallic liner may be metallurgically bonded to the inner surface of the host pipe adjacent to the host pipe's open ends. The metallurgical bonding may comprise a weld (or clad overlay weld) adjacent to each open end. A clad overlay weld is an annular weld between the metallic liner extremity and the inner surface of the host pipe, which has two main functions. The first main function is to connect the metallic liner extremity with the host pipe in a strong and seal proof way. The second main function is to clad and protect against corrosion a part of the inner surface of the host pipe which is not covered by the metallic liner. The clad overlay welds may be around 25-50 mm in length (i.e. they extend into the inner surface of the MLP to a distance of 25-50 mm from each open end).

Gases in the fluid being transported along the MLP can diffuse through the polymer liner and accumulate in the annulus between the polymer liner and the metallic liner. Depending on the way in which the MLP is used, for example if the interior of the MLP is rapidly decompressed during use, this may result in a risk of collapse of the polymer liner. To minimize this risk, the wall of the polymer liner may include one or more apertures to balance the pressure between the bore of the MLP and the annulus between the polymer liner and the metallic liner. In particular, the apertures can have a diameter of 1-10 mm, more particularly 2-5 mm. More particularly, the distance between each aperture may be about 0.5 m to about 12 m, even more particularly about 6 m.

The MLP of the invention may be in the form of a MLP stalk. A MLP stalk is generally about 750 m to about 2 km in length. The MLP stalk may comprise two or more shorter sections, or MLP joints, which have been connected together. Alternatively, the MLP of the invention may be in the form of a MLP pipeline comprising two or more MLP stalks which have been connected together. The metallic liner of the MLP stalk may be metallurgically bonded to the inner surface of the host pipe adjacent to the host pipe's open ends. The metallurgical bonding may comprise an extended clad overlay weld adjacent to each open end of the stalk. The extended clad overlay welds are clad overlay welds which are much longer than normal clad overlay welds. The extended clad overlay welds may be around 100-200 mm in length (i.e. they extend into the inner surface of the host pipe to a distance of 100-200 mm from each open end of the MLP stalk). The extended weld may be an extended annular weld. In particular, the extended clad overlay welds are only partially covered by the polymer liner. More particularly, the polymer liner does not reach the open ends of the MLP stalk. This offsets the polymer liner from the end of each MLP stalk in order to reduce the possibility of the polymer liner being damaged by high temperature when the MLP stalks are welded together.

The MLP pipeline may comprise one or more polymer sleeves fitted within the bore of the pipeline at the points at which the MLP stalks are connected. In particular, the one or more polymer sleeves may cover the extended clad overlay welds. This is in order to provide a continuous inner surface within the bore of the MLP. The polymer sleeve may generally be in the form of a tube or hollow cylinder as defined above. In particular, the polymer sleeve may include one or more apertures. These apertures can have the same sizes as those in the polymer liner. The polymer sleeve may have a recess on its outer surface where a fire blanket and thermal insulation can be fitted to protect the sleeve from excessive temperature during welding.

The present invention can be applied to any kind of MLP, for example a hydraulically expanded MLP or a thermo-hydraulic shrink fit MLP. These manufacturing processes are known in the art and are described, for example, in points (ii) and (iii) on pages 3 and 4 of Sriskandarajah, T., Roberts, G., 2013—Fatigue Aspects of CRA Lined Pipe for HP/HT Flowlines—Paper OTC 23932 presented at the OTC conference, Houston, 6-9 May 2013.

In relation to the methods of reeling and unreeling the MLP of the invention, the pressure inside the MLP (ie inside the bore of the MLP) during reeling or unreeling may be less than 5 bar, in particular less than 2 bar, more particularly substantially at atmospheric pressure.

In relation to the method of making the MLP having an internal polymer liner, step (a) may comprise connecting two or more shorter sections of MLP, also known as MLP joints, to form a longer section of MLP, also known as an MLP stalk. The MLP stalk is then used in the remaining steps of the process. The connecting may be by girth welding.

The polymer liner may be in the form of a tube or hollow cylinder as discussed above having an outer diameter D0. The host pipe lined with the metallic liner (ie the MLP) may be in the form of a tube or hollow cylinder as discussed above having an inner diameter D1. In particular, (D0−D1)/D0 may be 0.15 or less, more particularly between 0.01 and 0.10, preferably between 0.02 and 0.10. Step (b) may comprise connecting two or more shorter sections of polymer liner to form a longer section, also known as a polymer liner stalk. The connecting may be by a hot plate fusing process.

In step (c), the reducing of the outer diameter of the polymer liner may be by passing the polymer liner through a reduction box or die. The reduction box comprises rollers whereas the die does not comprise any roller. Optionally the reduction box comprises motorised rollers which push the polymer liner through the reduction box. Alternatively or additionally, the polymer liner may be connected to a winch, for example by a cable, and pulled through the reduction box or the die. The winch may be placed at the opposite end of the MLP from which the polymer liner is to be inserted, such that the winch can be used to pull the polymer liner into the MLP in step (d). For this purpose, the cable may extend along the bore of the MLP.

After the expansion in step (e) the polymer liner preferably has a length which is longer than that of the MLP into which it is inserted. Then, the method may comprise the step (f) of cutting back both opposing ends of the polymer liner. After step (f) the length of the polymer liner may be a shorter than the length of the MLP.

Steps (a)-(f) may be carried out whilst the MLP and polymer liner are substantially straight, ie prior to reeling on to a reel or drum.

After step (e), or after step (f), the method may comprise the step of (g) connecting the MLP, particularly if it is an MLP stalk, to another MLP produced by the method. The connecting may be by girth welding. In this way, an MLP pipeline comprising two or more MLP stalks may be formed.

After step (e), or after step (f), or after step (g), the method may comprise the step of reeling the MLP onto a reel. The pressure inside the MLP (ie inside the bore of the MLP) during this reeling step may be less than 5 bar, in particular less than 2 bar, more particularly substantially at atmospheric pressure.

A discussion of the theory behind the radial (or contact) pressure exerted by the polymer liner is set out below. According to an approximation given by Lame's equation, the mean circumferential compressive stress σ in the polymer liner is given by:

$$\sigma = \frac{2PD1^2}{D1^2 - D2^2} \rightarrow P = \frac{\sigma(D1^2 - D2^2)}{2D1^2} \quad (1)$$

where D1 is the outer diameter of the polymer liner inside the MLP, and D2 is the inner diameter of the polymer liner inside the MLP.

Furthermore, when the outer diameter D1 of the polymer liner is much larger than the wall thickness T of the polymer liner, Lame's equation can be approximated as follows:

$$D1 \gg T \rightarrow \sigma \approx \frac{PD1}{2T} \rightarrow P \approx \frac{2\sigma T}{D1} \text{ with } T = (D1 - D2)/2 \quad (2)$$

Figure 17:
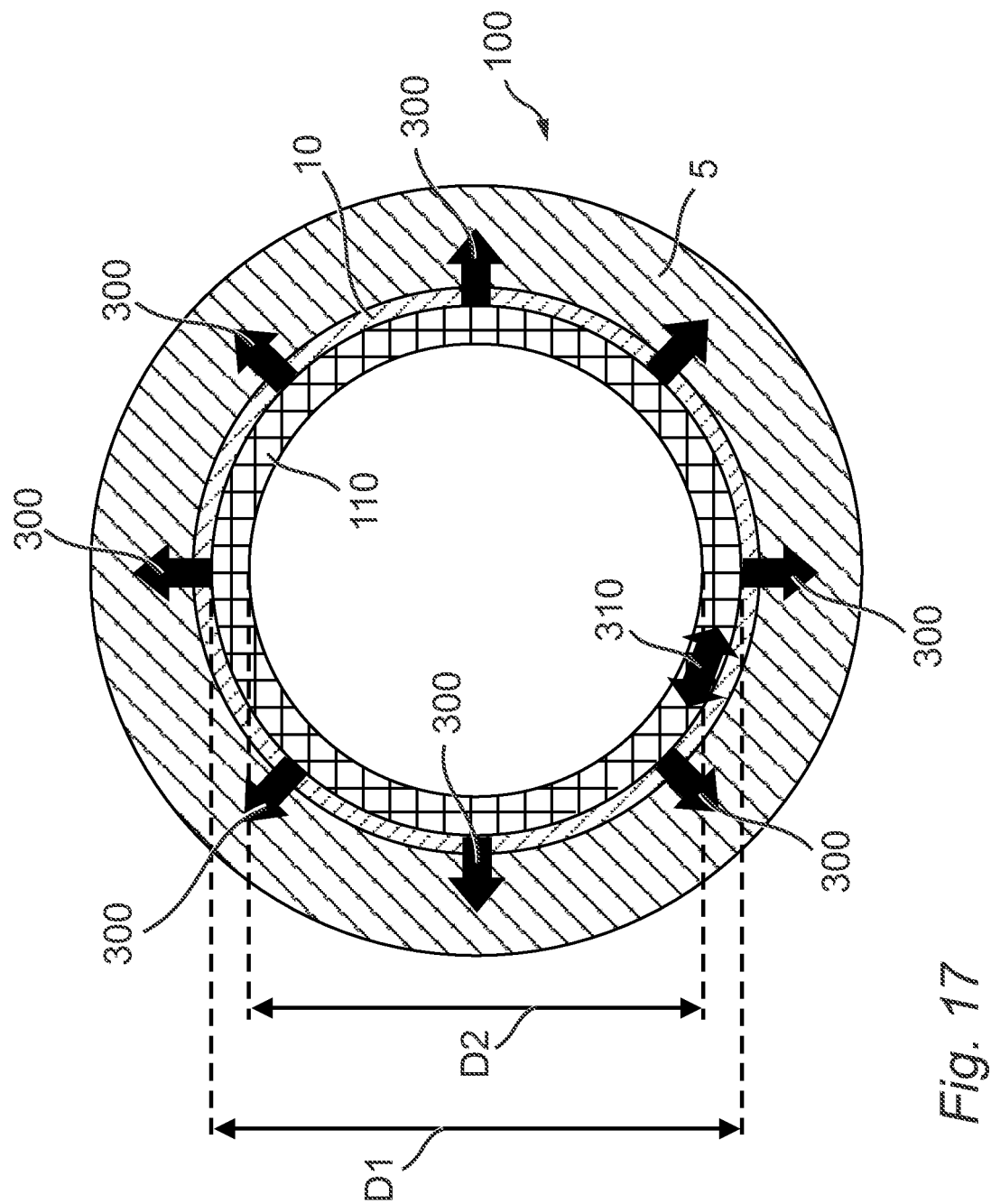
FIG. 17 shows an alternative cross-sectional view through the MLP pipeline according to one embodiment of the invention.

It can be deduced from the formula above that the contact pressure P depends on the polymer liner dimensions (diameter, thickness) and on the level of compressive stress σ in the polymer liner. A cross-section of the MLP, showing the circumferential compressive stress σ (310), the contact pressure P (300), as well as diameters D1 and D2, is shown in FIG. 17 (discussed in more detail below).

As mentioned above, the polymer liner may have an outer diameter (D0) which is larger than the inner diameter D1 of the MLP (and thus D1 being the diameter of the polymer liner inside the MLP). The compressive stress σ in the polymer liner depends on the diameter reduction during the polymer liner insertion (i.e. on (D0−D1)/D0) and also on the mechanical properties of the polymer. The mechanical properties of the polymer are dependent upon the temperature and are given by stress/strain compression test results carried out at different temperatures.

Figure 16:
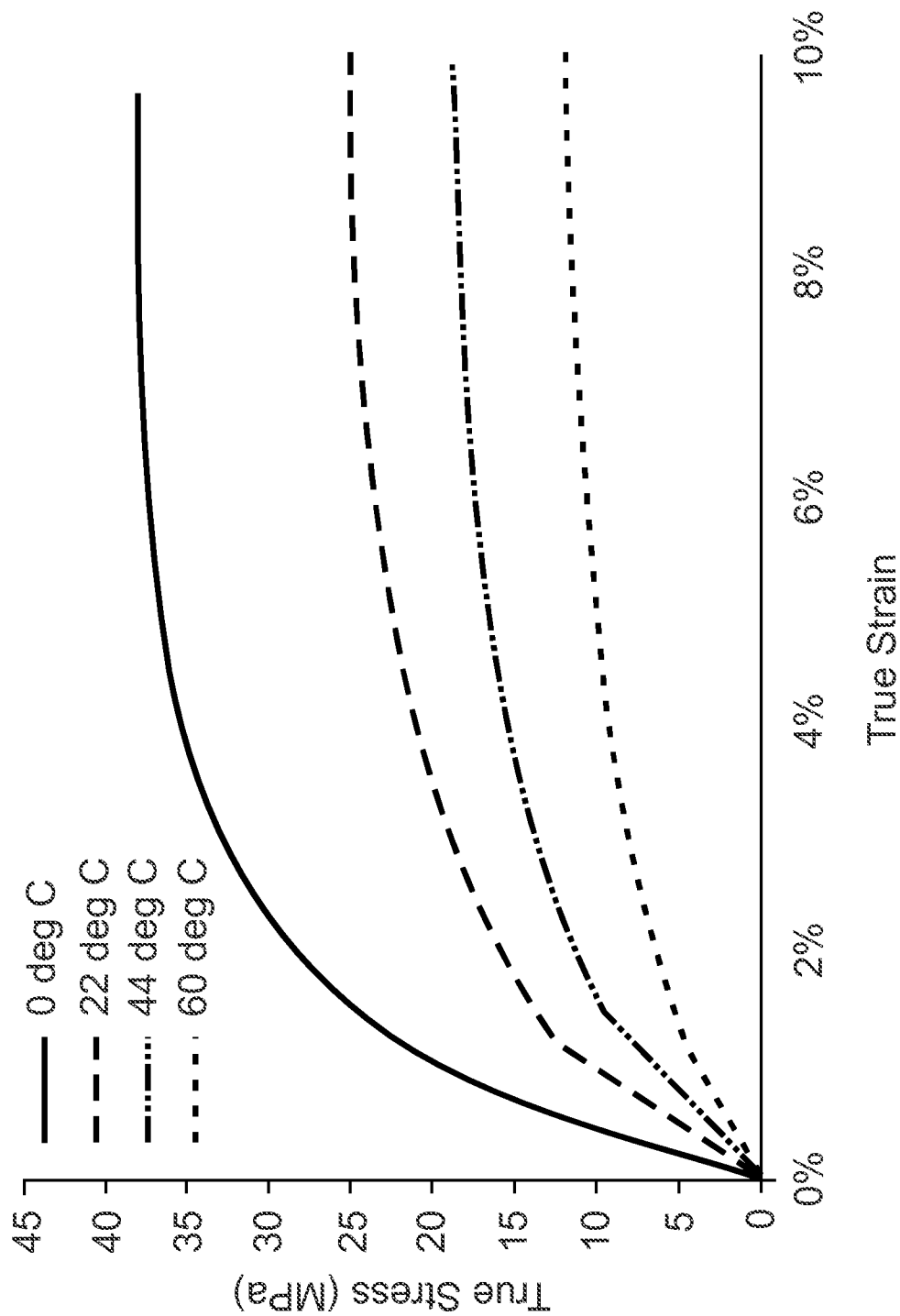
FIG. 16 is a graph showing the mechanical properties of a high density polyethylene (HDPE) polymer.

As an example, FIG. 16 shows the mechanical properties of a HDPE polymer (High Density PolyEthylene). The compressive stress σ depends on the compressive strain and on the temperature. For example, when a compression rate of 8% (compressive strain) is applied to HDPE at a temperature of 40° C., the resultant compressive stress in the material is around 18 MPa.

In the present invention, the compression level (compressive strain) which remains in the polymer liner after its insertion in the MLP is equal to (D0−D1)/D0, which is the relative diameter reduction of the liner.

The following rules/trends can be deduced from the equation (2) and from the material properties shown in FIG. 14:

(i) The contact pressure P is proportional to the polymer liner wall thickness T. This means that as the thickness of the polymer liner increases, so does the pressure. A straightforward solution to increase P is therefore to increase T. However, a significant increase in the liner wall thickness can result in drawbacks such as an undesirable reduction in the bore diameter and an unacceptable increase in the procurement cost. In relation to the invention, a compromise may be achieved when D1/T is between 10 and 100, more particularly between 25 and 50.

(ii) The contact pressure P is an increasing linear function of the compressive stress σ, and the compressive stress σ is an increasing non-linear function of the relative diameter reduction during the liner insertion ((D0−D1)/D0). One option to increase P is therefore to increase D0−D1/D0. The larger the diameter oversizing (D0−D1) of the polymer liner, and thus the larger the relative diameter reduction of the liner, the higher the resulting radial contact pressure P. However there is an upper limit to the oversizing of the polymer liner which is given by the process used for inserting the polymer liner in the MLP. To achieve the reduction in the outer diameter of the polymer liner, so that an oversized polymer liner can be fitted inside a smaller MLP, the polymer liner must be either pulled through a reduction box (including a series of rollers) or through a die. The former method is referred to as the roll-down approach whereas the latter method is called the swaging approach. As the pulling force is applied, axial (longitudinal) stress is exerted onto the liner cross section. According to the industry practice this stress may not exceed 50% of the liner yield stress during the liner fitment. The liner stress increases with the liner length and decreases with the liner thickness. For a polymer liner of a particular thickness and length, the liner will need to overcome a much lower resistance when passing through the roll-down box compared to the die. Consequently, a tighter fit can be achieved with the roll-down process. An 8% reduction in the outer diameter of the polymer liner can typically be achieved using the roll-down process (Sure-Liner™ provided by Allied Pipeline Technologies Inc). This compares to a typical reduction of 3% achieved using the swaging process (Swagelining Ltd). By optimising the roll-down process (eg using motorised rollers which both reduce the outer diameter of the polymer liner and push it into the MLP, as well as pulling the polymer liner into the MLP using a winch and cable), (D0−D1)/D0 values of up to 0.15 (15%) may be achieved.

(iii) Another option to increase P is to form the polymer liner from a polymer which has a high modulus (ie Young's modulus) so as to increase the compressive stress level for the same given compressive strain level. Considering this factor alone, HDPE should be preferred to LDPE or MDPE. However, there is a cost impact because high modulus polymers are generally more expensive. For example, PVDF has better mechanical properties and much better temperature resistance than HDPE but is also much more expensive. Thus, a balance of polymer properties and cost needs to be sought.

The following three examples show the effect of various parameters on the circumferential compressive stress σ and the contact pressure P.

Example A—Effect of Temperature

The structure of the lined MLP was as follows: Polymer liner made of HDPE; 8% diameter reduction (i.e. (D0−D1)/D0=0.08); Outer diameter of the polymer liner inside the MLP=D1=243.05 mm; Inner diameter of the polymer liner inside the MLP=D2=223.59 mm; (T=(D1−D2)/2=9.73 mm); MLP outer diameter (OD)=273.05 mm; MLP wall thickness (host pipe+CRA liner)=15 mm; D1/T=25.

The mechanical properties of the polymer liner were measured at various temperatures. Then the circumferential compressive stress σ and the contact pressure P were calculated for various temperatures and the results are set out in Table 1 below.

TABLE 1

| Temperature | Circumferential compressive stress σ | Contact pressure P |
| --- | --- | --- |
| 0° C. | 35.5 MPa | 28.4 bar |
| 20° C. | 24 MPa | 19.2 bar |
| 40° C. | 17 MPa | 13.6 bar |

Thus, as the temperature is increased there is a reduction in both the circumferential compressive stress σ and the contact pressure P.

Example B—Effect of Diameter Reduction of Polymer Liner

The structure of the lined MLPs tested were as follows: Polymer liner made of HDPE; Temperature=20° C.; D1=243.05 mm; D2=223.59 mm (T=9.73 mm); MLP OD=273.05 mm; MLP wall thickness (host pipe+CRA liner)=15 mm; D1/T=25.

The mechanical properties of the polymer liner were measured at 20° C. Then the circumferential compressive stress σ and the contact pressure P were calculated for various diameter reductions (i.e. (D0−D1)/D0) and the results are set out in Table 2 below.

TABLE 2

| Diameter reduction | Circumferential compressive stress σ | Contact pressure P |
| --- | --- | --- |
| 2% | 16.7 MPa | 13.4 bar |
| 4% | 21.5 MPa | 17.2 bar |
| 6% | 23.5 MPa | 18.8 bar |
| 8% | 24 MPa | 19.2 bar |

Thus, as the diameter reduction is increased there is an increase in both the circumferential compressive stress σ and the contact pressure P.

Example C—Effect of Polymer Liner Thickness

The structure of the lined MLPs tested were as follows: Polymer liner made of HDPE; Temperature=20° C.; Diameter reduction=8%; D1=243.05 mm; MLP OD=273.05 mm; MLP wall thickness (host pipe+CRA liner)=15 mm.

The mechanical properties of the polymer liner were measured at 20° C. Then the circumferential compressive stress σ and the contact pressure P were calculated for various thicknesses of polymer liner and the results are set out in Table 3 below.

TABLE 3

| Polymer liner thickness T | D1/T | Circumferential compressive stress σ | Contact pressure P |
| --- | --- | --- | --- |
| 4.86 mm | 50 | 24 MPa | 9.6 bar |
| 9.73 mm | 25 | 24 MPa | 19.23 bar |
| 19.46 mm | 12.5 | 24 MPa | 38.45 bar |

Thus, as the polymer liner thickness is increased, thereby reducing D1/T, the contact pressure P increases. However, the circumferential compressive stress σ does not change with increasing polymer liner thickness.

FIG. 1 shows a cross-sectional view of a MLP joint 1 comprising a substantially cylindrical carbon steel host pipe 5 having a substantially cylindrical inner surface 5A. The inner surface 5A is lined with a CRA liner 10. The CRA liner 10 is mechanically bonded to the inner surface 5A of the host pipe 5 as described above, and as is known in the art. For example, this can be by interference fit (hydraulic expansion or thermo-hydraulic shrink fit). The CRA liner 10 can be formed from any material known in the art for this purpose, for example duplex stainless steel or a nickel based alloy or an austenitic stainless steel. The MLP joint 1 is around 12 metres in length and has an inner diameter D1.

The host pipe joint has two opposing open ends 15,20. On the inner surface 5A of the host pipe 5, and adjacent to the open ends 15,20, are annular clad overlay welds 25,30 respectively. The annular welds 25,30 metallurgically bond the CRA liner 10 to the inner surface 5A of the host pipe 5. These clad overlay welds 25,30 are around 25-50 mm in length.

Figure 2A:
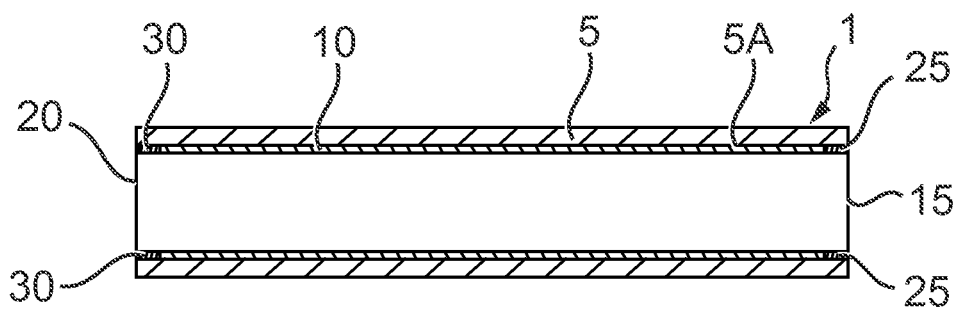
FIG. 2(a) shows a cross-sectional view of a MLP joint which is used in the middle of the MLP stalk, according to one embodiment of the invention.

The MLP joints are connected together to form an MLP stalk. FIG. 2(a) is identical to FIG. 1, and is used to show the structure of MLP joint 1 used to form the middle of the MLP stalk (i.e. used at all points along the MLP stalk except for its two ends).

Figure 2B:
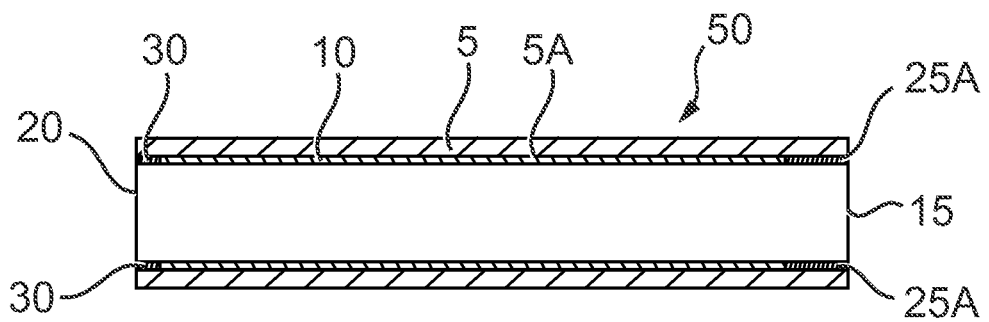
FIG. 2(b) shows a cross-sectional view of a MLP joint which is used at the ends of the MLP stalk, according to one embodiment of the invention.

FIG. 2(b) shows a cross-sectional view of the structure of the MLP end joint 50 used at the two ends of the MLP stalk. MLP end joint 50 is similar to MLP joint 1 and like features are labelled identically. The only difference is that at open end 15 of MLP end joint 50, which will form the open end of the MLP stalk, there is provided an extended annular clad overlay weld 25A. Extended clad overlay weld 25A is around 100-200 mm in length, thereby extending further along the inner surface 5A than the corresponding clad overlay weld 25 of MLP joint 1.

Figure 3:
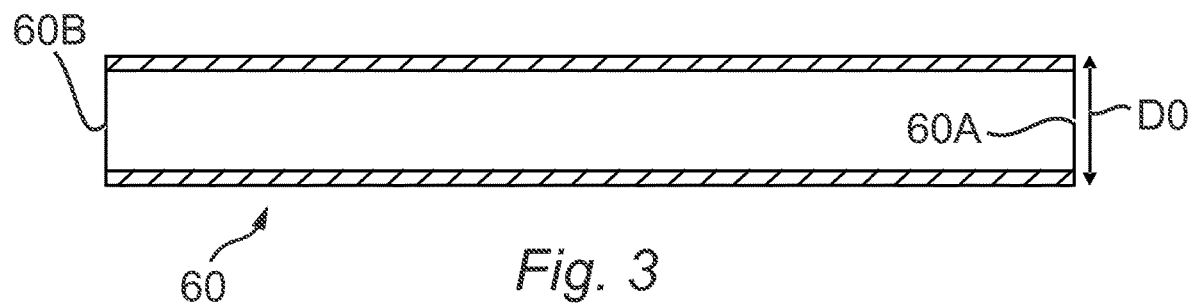
FIG. 3 shows a cross-sectional view of a polymer joint which is used to form the polymer liner stalk for the MLP stalk according to a first embodiment of the invention.
Figure 4:
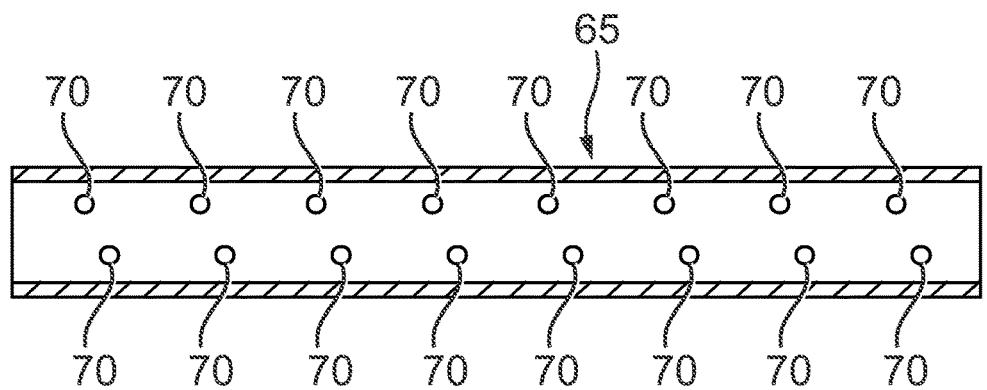
FIG. 4 shows a cross-sectional view of a polymer joint which is used to form the polymer liner stalk for the MLP stalk according to a second embodiment of the invention.

FIG. 3 shows a cross-sectional view of polymer joint 60, which is in the form of a hollow cylinder with outer diameter D0. The outer diameter D0 of polymer joint 60 is slightly larger than the inner diameter D1 of MLP joint 1. Polymer joint 60 comprises opposing open ends 60A, 60B. As described in more detail below, polymer joints 60 are connected together to form the polymer liner stalk which is inserted into the MLP stalk. FIG. 4 shows an alternative polymer joint 65, also in the form of a hollow cylinder. However, polymer joint 65 differs from polymer joint 60 in that it is provided with apertures 70 along its length. In use, the fluid which is transported along the resulting MLP pipeline can comprise gases which diffuse through the polymer liner and accumulate between the polymer liner and the CRA. This can cause damage to the polymer liner (liner collapse) and consequently block the pipeline when the pipeline is rapidly depressurised. Apertures 70 provide a pressure balancing effect. The apertures 70 are generally spaced around 6 metres apart.

Figure 6:
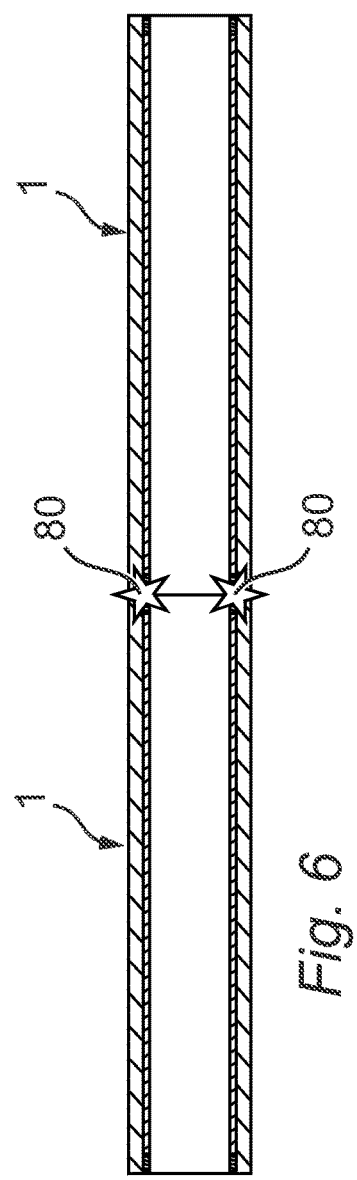
FIG. 6 shows a cross-sectional view of the connecting of two MLP joints during the formation of a MLP stalk, according to one embodiment of the invention.
Figure 7:
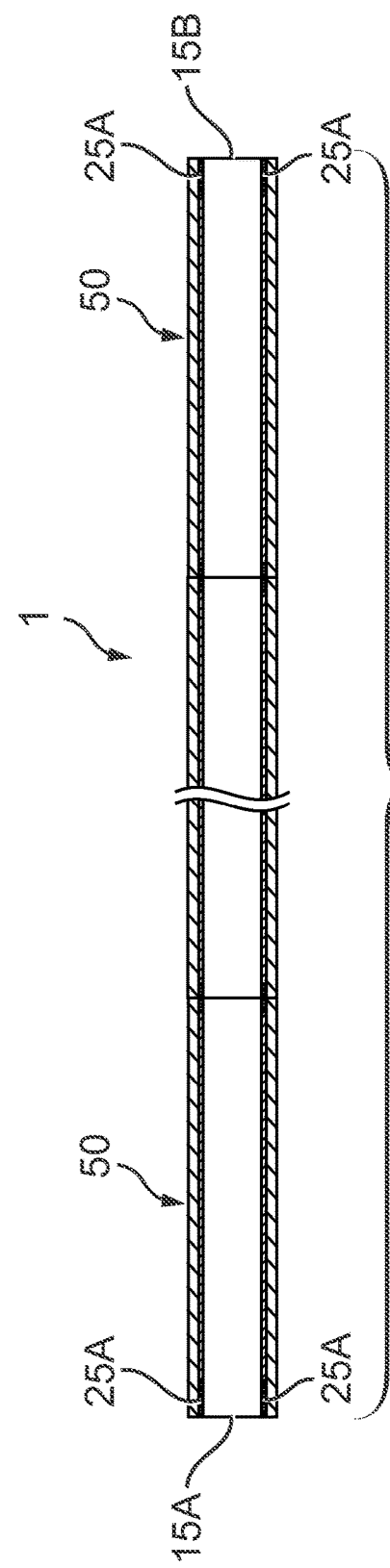
FIG. 7 shows a cross-sectional view of a MLP stalk according to one embodiment of the invention prior to the insertion of the polymer liner stalk.

FIG. 6 shows the connecting together of two MLP joints 1 as depicted in FIGS. 1 and 2(*a*). The open ends of the two MLP joints 1 are welded together at starred points 80 using a mainline girth welding procedure. Further identical MLP joints 1 are connected in the same way, and once a desired MLP stalk length has been reached (normally 750 m-2 km), an MLP end joint 50 as shown in FIG. 2(*b*) is connected to each end of the MLP stalk. This results in the structure of MLP stalk 100 shown in FIG. 7. As shown in FIG. 7, the MLP end joints 50 are attached such that the extended clad overlay welds 25A are adjacent to the open ends 15A,15B of MLP stalk 100.

Figure 8:
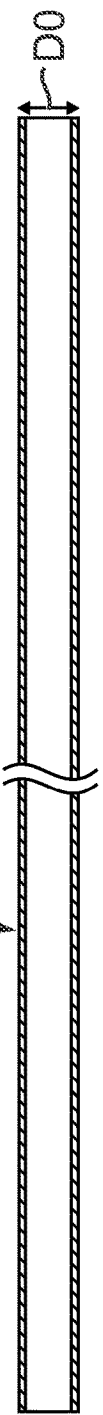
FIG. 8 shows a cross-sectional view of the polymer liner stalk according to one embodiment of the invention prior to insertion into the MLP stalk.

FIG. 8 shows a polymer liner stalk 110, which as mentioned above is formed by connecting together polymer joints 60 as shown in FIG. 3 (although polymer joints 65 as shown in FIG. 4 could also be used). The open ends 60A,60B of the polymer joints 60 are welded together using a hot plate fusion process until a desired polymer liner stalk length has been reached. As for the MLP stalk 100, the polymer liner stalk 110 will normally be around 750 m-2 km in length. The length of the polymer liner stalk 110 is preferably slightly longer than the length of the MLP stalk 100.

The insertion of the polymer liner stalk 110 into the MLP stalk 100 is shown in FIGS. 9-13. FIG. 9 shows the polymer liner stalk 110 immediately prior to insertion into the MLP stalk 100. The polymer liner stalk 110 is pulled into MLP stalk 100 using a cable 122 which is attached at its first end to the first end 110A of the polymer liner stalk 110 which is first inserted into the MLP stalk 110, and at its second end to a winch 121 at the opposite end of the MLP stalk 110 to that into which the polymer liner stalk 110 is being inserted. The cable 122 is attached to the first end 110A of the polymer liner stalk 110 via a pulling head 123. The pulling head 123 may be a cone formed from a polymer, the base of the cone being welded to the first end 110A of the polymer liner stalk 110, and the apex of the cone being connected to the cable termination via bolts. The circular base of the cone may have a diameter which is substantially the same as an outer diameter of the polymer liner stalk 110.

The cable 122 extends along the interior of the MLP stalk 100 from the polymer liner stalk 110 to the winch 121 through a reduction box 120 in the direction of arrow A and into MLP stalk 100. The reduction box 120 comprises rollers that compress polymer liner stalk 110 such that its outer diameter is reduced so that it is less than the inner diameter D1 of MLP stalk 100. This compression of the polymer liner stalk 110, which decreases its outer diameter, generally results in an increase in the length of the polymer liner stalk 110.

The rollers of the reduction box 120 may additionally be motor driven in order to push the polymer liner stalk 110 into the MLP stalk 100 and help the pulling action of the winch 121, which has the advantage of increasing the achievable diameter reduction of the polymer liner stalk 110.

In FIG. 10 the polymer liner stalk 110 is shown partially inserted into the MLP stalk 100 during the insertion process. FIG. 11 then shows the end of the insertion process, when the polymer liner stalk 110 is in its final position fully inserted into the MLP stalk 100, just before the pulling force applied by the winch 121 is released. The winch 121, the cable 122 and the pulling head 123 are disconnected just after this stage. The polymer liner stalk 110 slowly expands such that its outer diameter expands up to D1. As a result, the polymer liner stalk 110 presses against the CRA liner 10 on the inner surface 5A of the host pipe 5. The length of the polymer liner stalk 110 also decreases on release of the pulling force. FIG. 12 shows the end of the polymer liner expansion after disconnection of the winch 121, of the cable 122 and of the pulling head 123.

Then both extremities 110A, 110B of the polymer liner stalk 110 are cut to length. A pipeline counter-boring machine can be used for cutting back the liner extremities. After this step, as shown in FIGS. 13 and 14, the length of the polymer liner stalk 110 is such that it extends along the MLP stalk 100 slightly further than the CRA liner 10. Thus, at the open end 15A shown in FIG. 14, the polymer liner stalk extends such that it partially covers extended annular clad overlay weld 25A but does not reach open end 15A.

FIG. 17 shows an alternative cross-section of the MLP stalk 100 of FIG. 14, this cross-section being perpendicular to the major axis of the MLP stalk 100. The single-headed arrows 300 in FIG. 17 indicate the direction of the contact pressure P exerted by the polymer liner 110 on the CRA liner 10 as the polymer liner 110 expands. The double-headed arrow 310 indicates the direction of the circumferential compressive stress $\sigma$ in the polymer liner 110 (ie around the circumference of the polymer liner 110). As shown in this Figure, D1 is the outer diameter of the polymer liner 110 inside the MLP stalk 100, and D2 is the inner diameter of the polymer liner 110 inside the MLP stalk 100.

FIG. 15 shows the final step in the process of forming the MLP pipeline, in which the MLP stalks 100, each lined with a polymer liner stalk 110, are welded together at starred points 180 using a tie-in girth welding procedure. Further identical MLP stalks 100 are connected in the same way, and the resulting MLP pipeline 200 is then reeled onto a reel-lay vessel (not shown). The direction of reeling is indicated by the arrow R.

Figure 5:
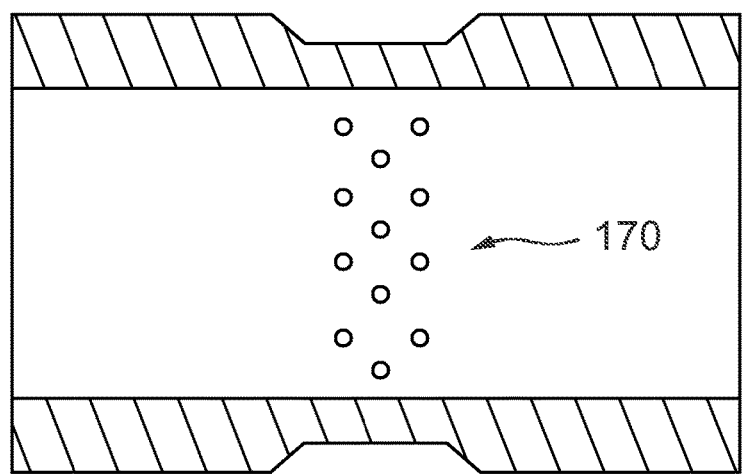
FIG. 5 shows a polymer sleeve for use with the MLP stalk according to one embodiment of the invention.

FIG. 5 shows a cross-sectional view of a polymer sleeve 75. The polymer sleeve 75 is in the form of a polymer liner having apertures indicated generally at 170. The polymer sleeve 75 can be fitted at the points 180 indicated in FIG. 15 where the lined MLP stalks 100 are welded together. In this way, the polymer sleeve 75 can assist in providing a continuous internal bore in the MLP pipeline 200. The polymer sleeve 75 would be inserted into an open end 15A,15B of the lined MLP stalk 100 prior to lining up the subsequent lined MLP stalk 100 and welding them together. The polymer sleeve may have a recess on its outer surface where a fire blanket and thermal insulation can be fitted to protect the sleeve from excessive temperature during welding.

The invention claimed is:

1. A mechanically lined pipe comprising a host pipe having an inner surface which is lined with a metallic liner, the metallic liner having an inner surface which is lined with a polymer liner which presses the metallic liner against the inner surface of the host pipe.

2. The mechanically lined pipe as claimed in claim 1, wherein the polymer liner exerts a contact pressure of 3-50 bar on the metallic liner.

3. The mechanically lined pipe as claimed in claim 2, wherein the polymer liner exerts a contact pressure of 7-30 bar on the metallic liner.

4. The mechanically lined pipe as claimed in claim 1, wherein the polymer liner comprises one or more apertures.

5. The mechanically lined pipe as claimed in claim 1, wherein the polymer liner is formed from at least one polymer selected from the group consisting of low-density polyethylene (LDPE), medium-density polyethylene (MDPE), high-density polyethylene (HDPE), polyethylene of raised temperature resistance (PE-RT), polypropylene (PP), polyamide (PA) and polyvinylidene fluoride (PVDF).

6. The mechanically lined pipe as claimed in claim 1, wherein the polymer liner is in the form of a tube and the ratio of the outer diameter of the tube to the wall thickness of the tube is between 10:1 and 100:1.

7. The mechanically lined pipe as claimed in claim 1 in the form of a pipeline comprising two or more mechanically lined pipe stalks connected together, with one or more polymer sleeves being provided within the pipeline at the point at which the mechanically lined pipe stalks are connected.

8. A method of reeling a mechanically lined pipe as claimed in claim 1, comprising the step of reeling the mechanically lined pipe onto a reel.

9. A method of laying a mechanically lined pipe as claimed in claim 1, comprising the step of unreeling the mechanically lined pipe from a reel.

10. The method as claimed in claim 8, wherein the pressure inside the mechanically lined pipe is less than 2 bar.

11. A method of making a mechanically lined pipe having an internal polymer liner, the mechanically lined pipe comprising a host pipe having an inner surface which is lined with a metallic liner, the method comprising the steps of:

(a) providing a mechanically lined pipe having an internal diameter,
(b) providing a polymer liner having an outer diameter which is greater than the internal diameter of the mechanically lined pipe,
(c) reducing the outer diameter of the polymer liner such that it is less than the internal diameter of the mechanically lined pipe,
(d) inserting the polymer liner into the mechanically lined pipe, and
(e) allowing the polymer liner to expand such that it presses the metallic liner against the inner surface of the host pipe.

12. The method as claimed in claim 11, wherein step (c) comprises passing the polymer liner through a reduction box or die.

13. The method as claimed in claim 11, wherein step (d) comprises pulling the polymer liner into the mechanically lined pipe using a winch.

14. The method as claimed in claim 11, wherein after step (e) the method comprises the step of reeling the mechanically lined pipe onto a reel.

15. The method as claimed in claim 14, wherein the pressure inside the mechanically lined during the reeling step is less than 2 bar.

* * * * *